(12) United States Patent
Hamilton

(10) Patent No.: US 8,186,767 B2
(45) Date of Patent: May 29, 2012

(54) WHEEL RIM ASSEMBLY WITH INTEGRAL AIR COOLED LUBRICANT CAVITY AND HUB

(76) Inventor: Thomas S. Hamilton, Priest River, ID (US)

( * ) Notice: Subject to any disclaimer, the term of this patent is extended or adjusted under 35 U.S.C. 154(b) by 215 days.

(21) Appl. No.: 12/561,328

(22) Filed: Sep. 17, 2009

(65) Prior Publication Data

US 2010/0066158 A1 Mar. 18, 2010

Related U.S. Application Data

(60) Provisional application No. 61/097,946, filed on Sep. 18, 2008.

(51) Int. Cl.
*B60B 27/02* (2006.01)
(52) U.S. Cl. .................. 301/109; 301/6.2; 301/105.1
(58) Field of Classification Search .................. 301/6.2,
301/6.3, 64.201, 64.202, 64.203, 64.301,
301/64.302, 64.303, 64.305, 64.306, 105.1,
301/109, 63.109, 64.304, 64.5; 244/103 R;
184/5.1
See application file for complete search history.

(56) References Cited

U.S. PATENT DOCUMENTS

| | | | | |
|---|---|---|---|---|
| 1,627,406 A * | 5/1927 | Rauter | ................ | 301/63.109 |
| 2,728,618 A * | 12/1955 | Brown et al. | .............. | 384/591 |
| 2,854,287 A * | 9/1958 | Stephens | .................... | 301/108.2 |
| 2,983,550 A * | 5/1961 | Gannett | ................... | 301/64.303 |
| 2,990,216 A * | 6/1961 | Albright et al. | .............. | 301/6.1 |
| 2,998,282 A * | 8/1961 | Moyer | ............................ | 301/6.1 |
| 3,089,738 A * | 5/1963 | Steiner | .......................... | 384/473 |
| 3,114,579 A * | 12/1963 | Isenbarger | .................. | 301/108.2 |
| 3,301,357 A * | 1/1967 | Cussons et al. | ............ | 188/264 R |
| 3,395,950 A * | 8/1968 | Brandt | .......................... | 384/148 |
| 3,642,327 A * | 2/1972 | Walther | ..................... | 301/108.1 |
| 3,778,123 A * | 12/1973 | Hendler et al. | ............. | 384/132 |
| 3,871,709 A * | 3/1975 | Eaton | ...................... | 301/64.304 |
| 4,039,229 A * | 8/1977 | Ohlberg | ........................ | 384/471 |
| 4,190,133 A * | 2/1980 | Ploeger | ......................... | 184/5.1 |
| 4,636,007 A * | 1/1987 | Persons | ..................... | 301/105.1 |
| 5,098,168 A * | 3/1992 | Johnson | ..................... | 301/124.1 |
| 5,277,479 A | 1/1994 | Koyama et al. | .............. | 301/64.7 |
| 5,303,800 A | 4/1994 | Persson | ........................ | 184/5.1 |
| 5,505,525 A | 4/1996 | Denton | ...................... | 301/108.4 |
| 5,740,609 A | 4/1998 | Jurus | ......................... | 29/894.324 |
| 6,017,097 A | 1/2000 | Weir | .......................... | 301/105.1 |
| 6,273,519 B1 | 8/2001 | Tsou | .......................... | 301/108.2 |
| 6,447,072 B1 | 9/2002 | Johnson | ..................... | 301/108.2 |
| 2006/0231336 A1* | 10/2006 | Crawford | ..................... | 184/5.1 |

* cited by examiner

*Primary Examiner* — Kip T Kotter
(74) *Attorney, Agent, or Firm* — Robert C. Kain, Jr.

(57) ABSTRACT

The two-piece wheel rim assembly includes first and second hub sections affixed together and rotatably mounted on an axle by a set of bearings which are longitudinally spaced apart on the axle. The hub sections have radially inboard wall segments and radially outboard segments. The inboard segments form a radial cavity about the axle longitudinally bounded by the bearings. An oil bath substantially fills the radial cavity except for a small thermal expansion air pocket. The thermal expansion air pocket is positioned above the axle and the bearings when the hub-tire combination is in use. The thermal expansion air pocket has a nominal size only sufficient to account for thermal expansion and contraction of the wheel.

15 Claims, 6 Drawing Sheets

FIG.2
SECTION A'-A" OF FIG.5

WHEEL RIM ASSEMBLY WITH INTEGRAL AIR COOLED LUBRICANT CAVITY AND HUB

This is a regular patent application based upon and claiming the benefit of provisional patent application Ser. No. 61/097,946, filed Sep. 18, 2008, the contents of which is incorporated herein by reference thereto.

The present invention relates to a wheel rim assembly for airplane tires used in connection with amphibious aircraft.

BACKGROUND

This invention pertains to wheels, specifically to wheel designs where the hub is an integral part of the wheel.

Historically wheel hub or rim designs utilized in some aircraft landing systems have used a grease lubricant for the hub which requires the user to first remove the entire wheel assembly from the aircraft and further disassemble the wheel itself, in some cases, in order to service the lubricant.

Prior art wheel assemblies using oil bath hub designs show that the lubricant port is located on the end of the axle or spindle and lubricants are serviced either by removing the hub in its entirety or by servicing ports located on the axial end of the hub itself. These service ports permit lubricant to be delivered through the hub, around or through the seals, and then around or through the spindle or axle.

U.S. Pat. No. 6,017,097 to Weir (2000) is a wheel hub assembly design which specifically addresses the need for a drivable wheel hub assembly, capable of supporting the driven wheels, independent of the drive axle as used in miniature automobile racing. This reference does not have a lubricant bath hub design, nor a wheel design with integral hub nor heat dissipating hub features.

U.S. Pat. No. 5,740,609 to Jurus (1998) addresses the manufacture of a one piece wheel by the use of spin forming.

U.S. Pat. No. 5,277,479 to Koyama et al (1994) relates to the manufacture of a resin wheel with an axle hub. This reference does not discuss heat dissipation nor lubrication in the seal and bearing cavity, nor ingress and egress ports for lubrication servicing on the wheel.

U.S. Pat. No. 6,447,072 to Johnson (2002) and U.S. Pat. No. 6,273,519 to Tsou (2001) and U.S. Pat. No. 5,505,525 to Denton (1996) and U.S. Pat. No. 5,303,800 Persson (1994) show oil-bath wheel hub designs but these hub designs do not have the oil servicing port integral to the wheel assembly. The prior art presented therein is typically an oil service plug-port combination mounted by means of fasteners or threading onto an axle end or spindle end and the lubricant is serviced through the oil bath hub independent of the function of the wheel. These prior art references discuss servicing the lubricant through the spindle or axle, not the hub retaining the tire.

As more fully discussed in the summary and the detailed description that follows, the invention herein utilizes an internal chamber within the wheel assembly as the oil bath hub and the means to maintain the oil is a fill-bleeder value plug on the hub wheel itself. The prior art does not utilize an integral function of the hub to define a radial space about the axle and provide a bath for the axle bearing set. The prior art lubrication systems are all independent of the wheel hub. Further, the prior art does not show the use of the wheel for heat transfer.

SUMMARY AND OBJECTS OF THE INVENTION

It is an object of the invention to provide an improved hub design with an internally formed radial cavity which holds an oil bath for the axle and the spaced apart bearings.

It is another object of the present invention to provide longitudinal axial cooling passages in the wheel hub.

The present invention includes a two-piece or a multi-piece wheel rim assembly upon which is mounted an airplane tire. The rim and tire assembly is used for amphibious aircraft. The wheel rim assembly includes first and second hub sections bolted or otherwise removably affixed together. The tire is on the wheel hub. The wheel hub is rotatably mounted on an axle by a set of bearings (first and second bearings) which are longitudinally spaced apart on the axle. The wheel hub sections have respective radially inboard wall segments, radially spaced from the axle, which form a radial cavity about the axle longitudinally bounded by the bearings. An oil bath substantially fills the radial cavity except for a thermal expansion air pocket. The thermal expansion air pocket is positioned above the axle and the bearings when the hub-tire combination is in use. The thermal expansion air pocket has a nominal size only sufficient to account for thermal expansion and contraction of the wheel hub such that substantially no oil is forced out of the radial cavity during thermal contraction of the wheel hub.

The invention is an integrated wheel and hub assembly, that utilizes ports located directly on the wheel hub assembly to service the lubricant. This configuration allows for a number of unique advantages including the direct servicing of lubricant while the wheel is still located on a spindle or axle without having to remove the wheel or disassembling the wheel, accessing the lubricant in the hub directly through the ingress and egress ports located in the wheel hub assembly and complete coverage of the internal bearings with lubricant due to the location of the ports being outside of the circumference of the internal bearings.

This invention also promotes heat dissipation away from the axle-inner hub segments by providing voids or longitudinal axial passages which allow air flow across greater surfaces of the wheel hub. Therefore, the invention includes a hollow wheel hub design and axle nuts used to hold the axle bushing outside of lubricant bath.

The present invention is a wheel assembly for vehicles which incorporates the wheel rim and a lubrication hub defining a reservoir for a lubricant which is in turn cooled by the inherent design of the wheel and allows the lubricant to be serviced through the body of the wheel.

This assembly improves on designs that have oil bath reservoirs for lubrication but do not allow heat dissipation through wheel. This assembly improves on oil bath hub assembly designs that have service ports typically mounted to the end of a spindle or axle assembly and require lubricant servicing through the end-mounted ports into the hub assembly, by having the hub internal to the wheel and allowing lubricant servicing through the wheel body. This design improves on wheel designs that are one piece but do not incorporate a liquid for lubrication. This design improves upon grease only hub type wheels which must be removed in order to service wheel axle and bearing lubricant, the invention presented reduces and/or eliminates the need to remove the wheel in order to service wheel axle and bearing lubricant by using the lubricant ingress and egress ports located on the wheel itself.

BRIEF DESCRIPTION OF THE DRAWINGS

Further objects and advantages and features of the present invention are found in the detailed description of the preferred embodiments discussed below, when taken in conjunction with the accompanying drawings.

DETAILED DESCRIPTION OF PREFERRED EMBODIMENTS

The present invention is a wheel rim assembly with integral air cooled lubricant cavity and hub. The rim assembly includes wheel halves with integrated longitudinal air cooled passageways, cooling an integral radially inboard lubricant cavity. The other half wheel hub has an integrated air cooled lubricant cavity. The two wheel halves are sealed into place with an annular peripheral groove located at a radially coextensive position on both wheel halves. An end seal is disposed, at each longitudinal axial end of each wheel half beyond the bearings, in an annular groove. The wheel halves have longitudinal axial openings forming radial voids, between inboard wheel hub walls and outboard wheel hub walls, whose function is to promote air flow and cooling of lubricant cavity. These elements are connected as follows. The first wheel half is attached along a radial plane to the second wheel half with a seal seated between the two wheel halves. An axial end wheel seal caps the axial end of each hub beyond the bearings.

A lubricant cavity filler-bleeder valve assembly means is attached to either wheel half, for lubricant egress. The lubricant cavity filler assembly is attached to either wheel half for lubricant ingress. This lubricant filler plug permits the user to inject lubricant oil into the internal radial cavity and flood the cavity with oil. A wheel bearing is mounted within each wheel half. The two wheel halves are then attached together by wheel half fasteners (nuts and bolts or other fastening systems) and an axle and bearing tensioner assembly is disposed on the axle beyond the end seal. In other words, the end seal is longitudinally axially between bearings and the axle tensioner. It should further be noted that: (a) the wheel halves can be made of various materials, such as but not limited to composite, plastic, aluminum (or any other metal or metal alloy), but aluminum is preferable; (b) that for this construction, two wheel halves are shown, but the design is not limited by a single piece wheel or multiple wheel parts; (c) the wheel and axle seals can be made of various materials, such as but not limited to rubber, foam, plastic, or any other sufficiently resilient material, but standard rubber seals are preferable; (d) the bleeder and filler plug assemblies can be assemblies or single piece plugs, but standard bleeder and filler assemblies are preferred; (e) the bleeder and filler assemblies or plugs can be made of various materials, such as but not limited to composite, plastic, aluminum (or any other metal or metal alloy), but aluminum is preferable; (f) the wheel halves are attached to each other by various means, such as but not limited to friction fit, adhesives, screws, nuts and bolts or threading one half to the other, but nuts and bolts are the preferred fastening method.

Figure 1:
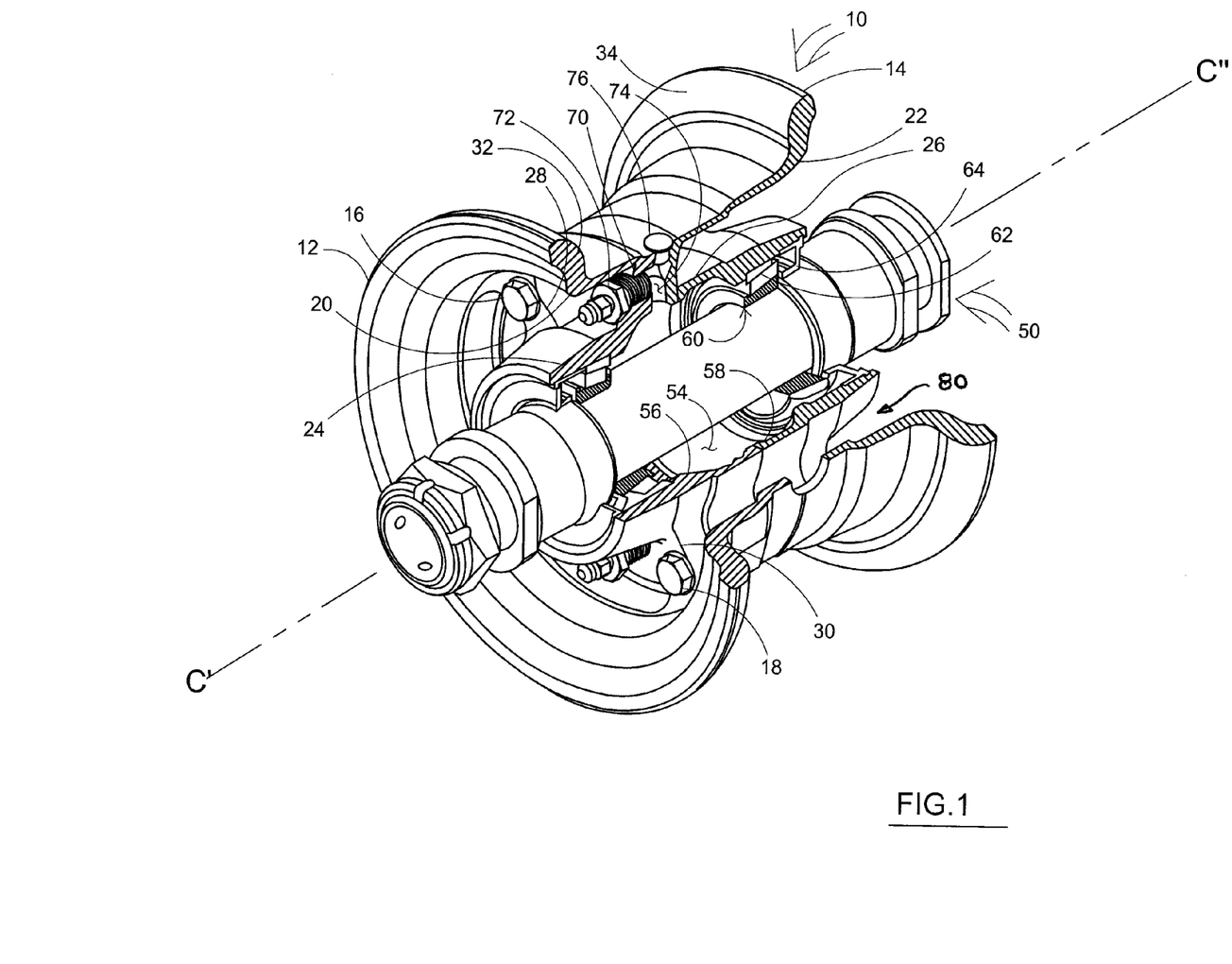
FIG. 1 is diagrammatic, partial broken away, perspective view of the wheel hub assembly.
Figure 2:
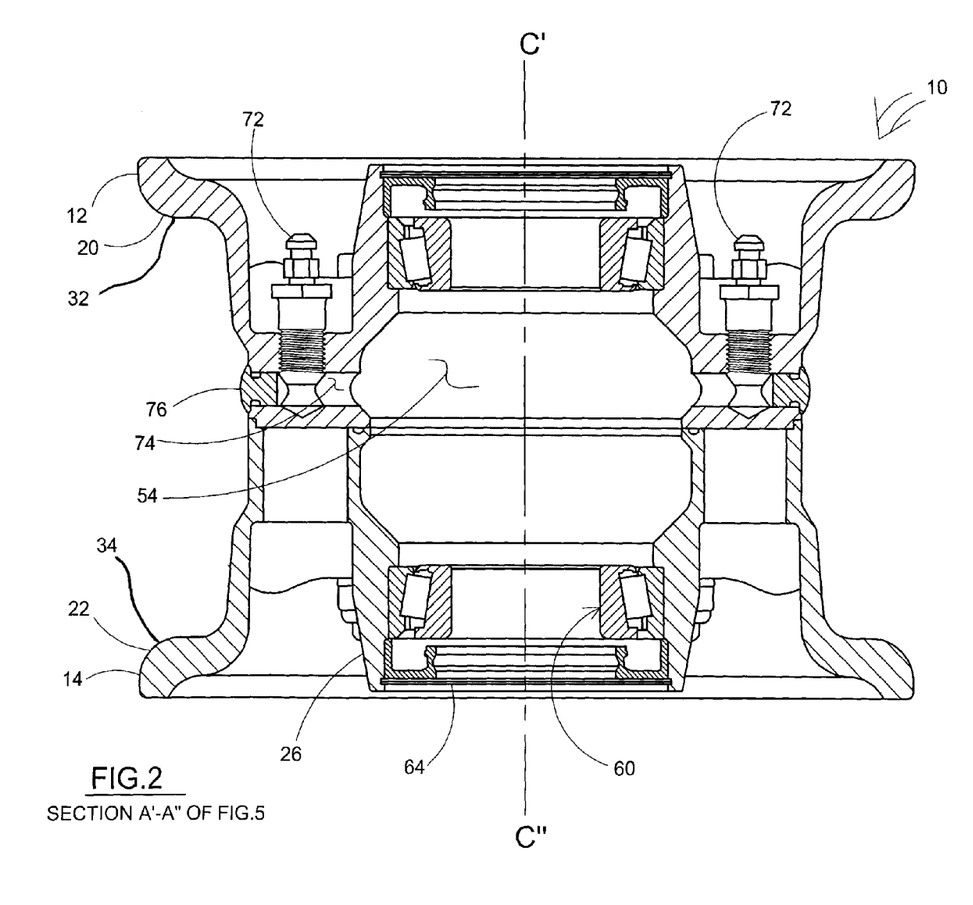
FIG. 2 diagrammatically illustrates a cross-section of wheel assembly from the perspective of section line A'-A" in FIG. 5.
Figures 4, 5:
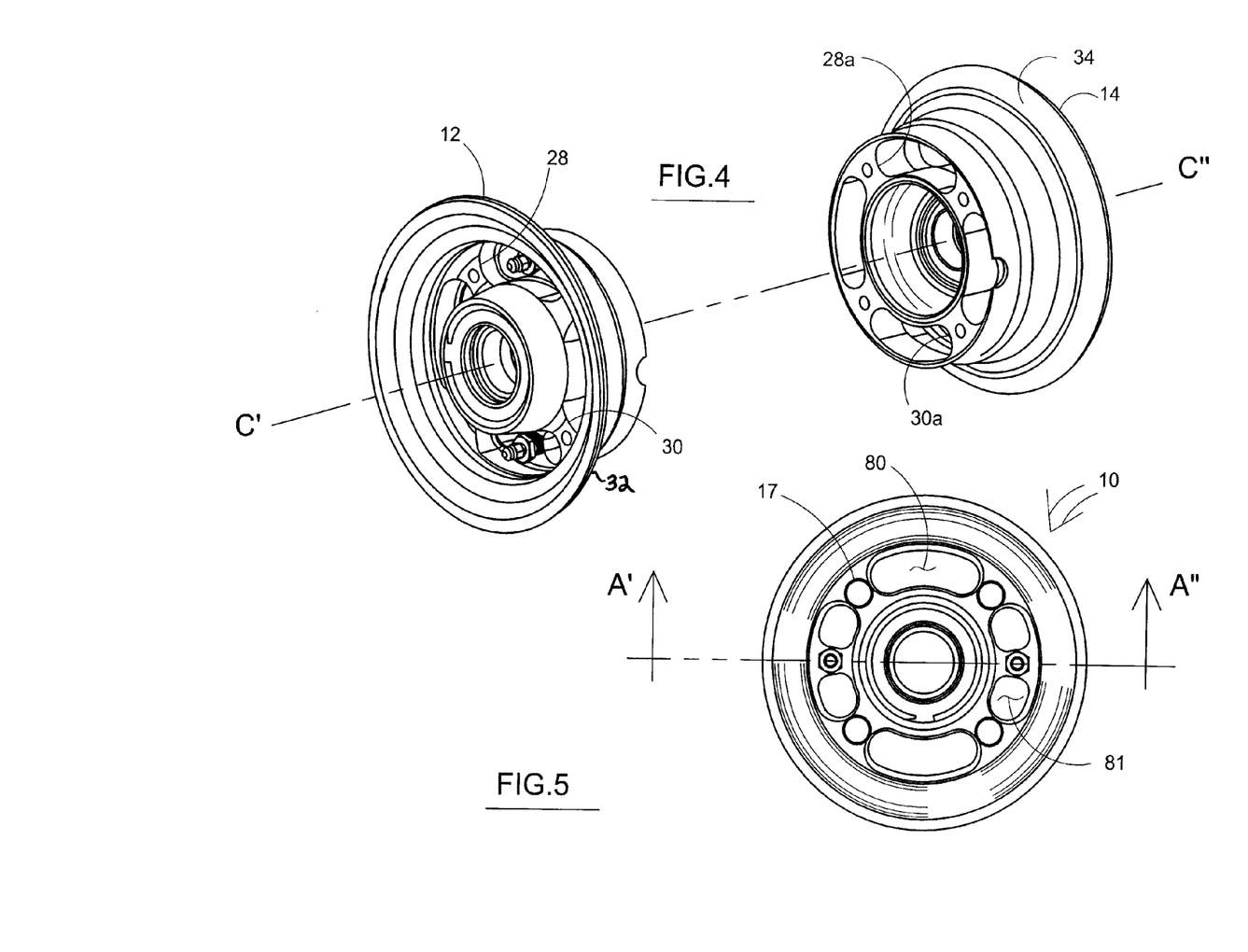
FIG. 4 diagrammatically illustrates wheel hub sections separated from each other.
FIG. 5 diagrammatically illustrates a side elevational view of wheel rim assembly.

The present invention relates to a two piece or a multi-piece wheel rim assembly for an airplane tire adapted to be mounted on an amphibious aircraft. Similar numerals designate similar items throughout the drawings. FIGS. 1 and 2 are discussed concurrently herein. Although a "two-piece" wheel assembly is discussed herein, the system may have multiple pieces, that is, the left and right hub sections discussed below may be supplemented by an annular joinder ring piece interposed between the left and right hub sections such that when the wheel assembly sections are bolted together, a three-piece hub assembly is formed. The claims appended discuss "two-piece" systems and these claims are meant to cover two or more hub sections joined together, such when affixed together, these hub sections form the interior radial space or cavity and the axially longitudinal cooling passages between the inner and outer rim walls. The two piece wheel assembly 10 includes a first and a second wheel hub section 12, 14 (FIG. 4 shows hub section 12 separated from hub section 14). Hub sections 12, 14 are fixed together via nut and bolt sets 16, 18. Other axially disposed fastener systems may be used. A plurality of bolts are utilized to fix hub section 12 to hub section 14. See FIG. 5, bolt holes 17.

Each wheel hub section includes a radially outer wall segment 20, 22 (see respective wheel hub section 12, 14) which is radially spaced apart from radially inboard hub segment 24, 26. Radially outboard hub segments 20, 22 are spaced apart from inboard segments 24, 26 by a plurality of radially extending spokes. See, for example, spokes 28, 30. FIG. 4 shows spokes 28, 30 on hub section 12 and spokes 28a and 30a on hub section 14. Several spokes are utilized on the wheel hub sections in order to adequate support for spacing the outer wall segments 20, 22 from the inner wall segments 24, 26.

Wheel hub sections 12, 14 have exterior interface tire surfaces 32, 34. Wheel hub assembly 10 has an axial center line C'-C" and axle assembly 50 is disposed on axial center line C'-C". Axle assembly 50 is a common axle assembly for airplane tires used on amphibious aircraft. The wheel rim assembly 10 is rotatably mounted on axle 50 by a pair of longitudinally spaced apart bearings. The bearings provide longitudinal axial boundaries for a radially inboard cavity 54. Radial cavity 54 is formed by the inboard surfaces 56, 58 of inner wall segments 24, 26 of hub sections 12, 14. Since the mounting of each hub section 12, 14 is substantially identical (other than mirror or left-right orientation), a single description of the bearing system is provided herein. Bearing assembly 60 is a conventional manner to the hub section 14 with an inner bearing race, on the surface of axle 50, and an outer bearing race mounted on inner hub section 26 via a bearing mounting cone 62. An annular wheel seal 64 is longitudinally axially outboard of bearing assembly 60. Annular wheel seal 64 provides a fluid seal for the bearing assembly 60 and inboard cavity 54.

Figure 1A:
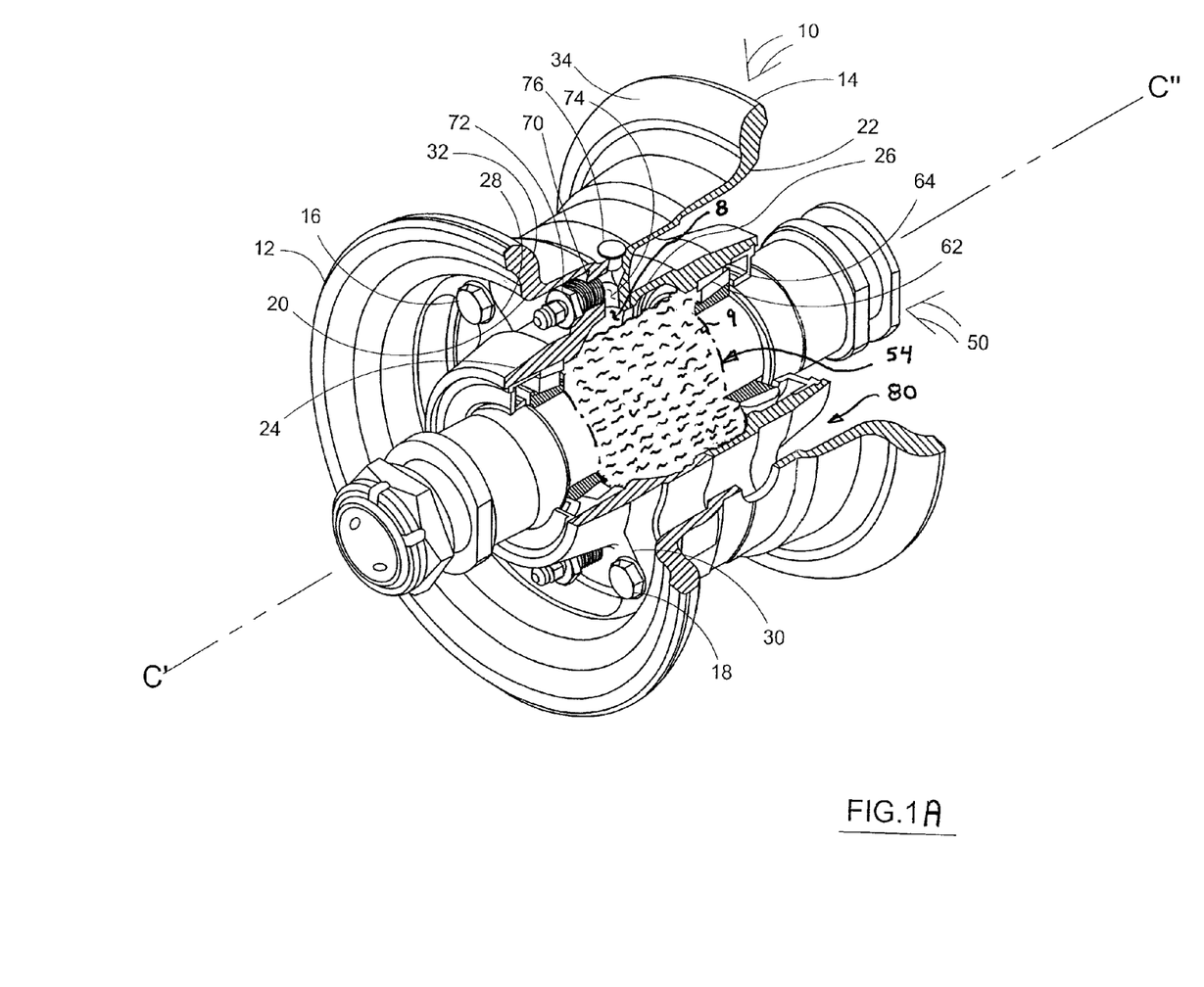
FIG. 1A shows that the radially inboard cavity is filled almost completely with aerospace grade oil other than a very small air expansion space.

Some radially extending spokes include a threaded port 70 into which is threadably mounted a fill and bleeder valving system 72. System 72 is a conventional lubricant input and/or output valve. The inboard side of port 70 leads to a radial passage 74. Passage 74 is formed by the interlocked hub sections 12, 14. Radial passage 74 is open to and in fluid communication with inboard radial cavity 54. Inboard radial cavity 54 retains a bath of oil 9 for the axle and bearing system (about 3-4 ounces of oil). Plug 76 is simply a mechanical plug which is used to close the machined port which enables the manufacturer to machine the radial passageway 74 from the peripheral threaded port 70 for bleeder-fill valving means 72. Various other conventional items are used to mount wheel rim assembly 10 onto axle assembly 60 such as retaining rings, o rings and other common items. As discussed later, radially inboard cavity 54 is filled almost completely with aerospace grade oil 9 (multi-viscosity oil with an emulsifier). A very small air expansion space 8 (FIG. 1A) is provided in interior cavity 54. Studies have shown that approximately 85-90% of the volume of cavity 54 is filled with oil thereby completely immersing the left and right bearing assemblies 60 in oil when the rim and tire assembly is upright and in use. See FIG. 6. In addition, the radially displaced outer wall segments 20, 22 compared to inner wall segments 24, 26, define longitudinal axial cooling passages, one of which is shown in FIG. 1 as longitudinal passage 80 (see also FIG. 5), thereby enhancing the cooling of the wheel rim assembly 10 when the wheel rim is subjected to a braking action. The brake may be axially attached to the wheel hub 10 as is common in the airplane art. This cooling is important because when brakes are applied to the wheel rim, the brakes greatly heat up the wheel assembly and therefore create a thermal expansion of the wheel rim assembly, thermal expansion of interior cavity 54 and the expansion affects the oil and the small thermal expansion air pocket 8 in cavity 54.

FIG. 2 diagrammatically illustrates a cross-section of wheel assembly 10 from the perspective of section line A'-A" in FIG. 5.

Figure 3:
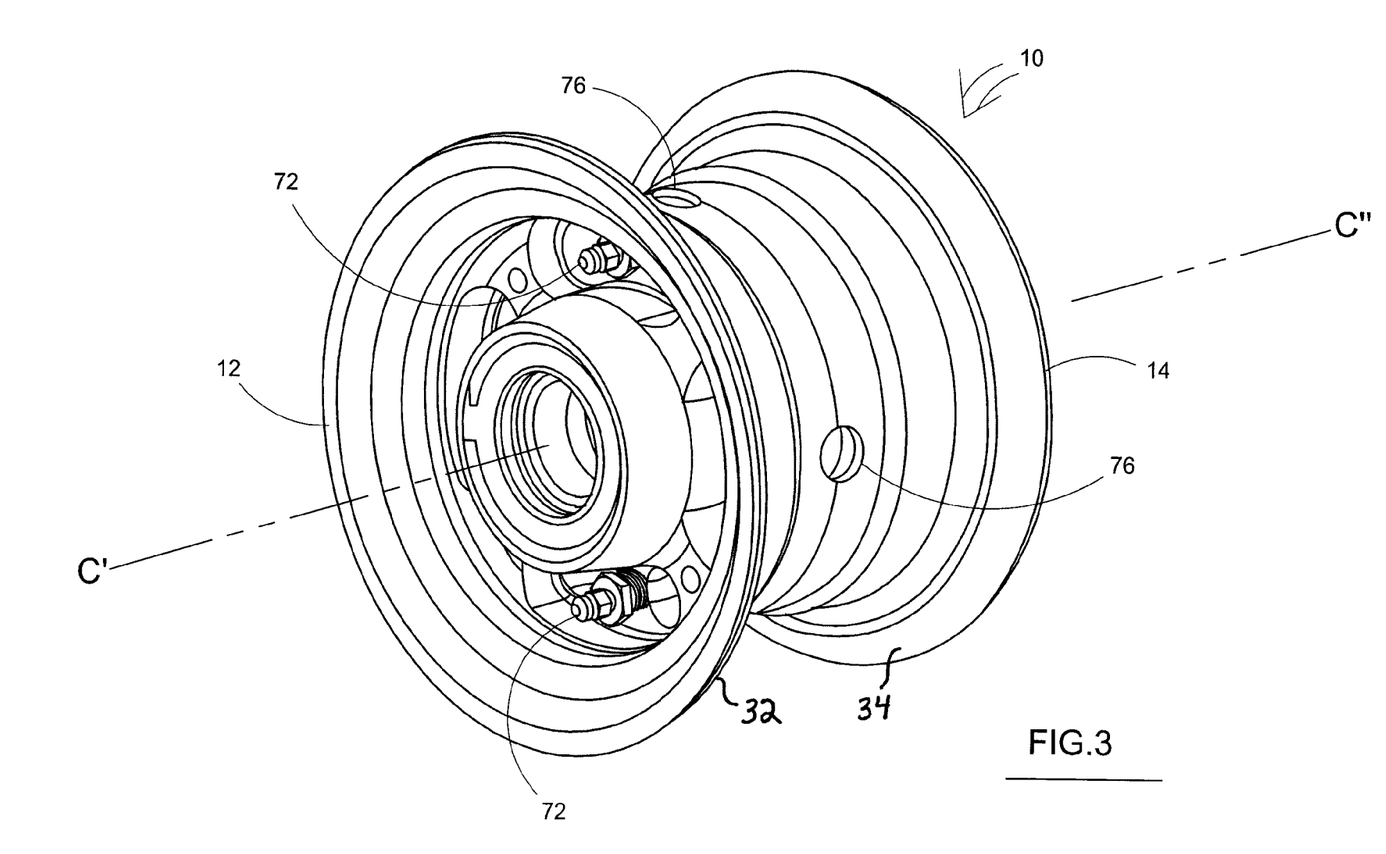
FIG. 3 diagrammatically illustrates a perspective view of the assembled wheel rim assembly.

FIG. 3 shows a perspective view of the assembled wheel rim assembly 10. Preferably, two fill-bleed valves 72 are utilized. During an oil fill cycle, the uppermost fill valve is at 1:00 PM in order to achieve the nominal thermal expansion air pocket discussed herein.

FIG. 4 diagrammatically illustrates wheel hub sections 12, 14 separated from each other.

FIG. 5 diagrammatically illustrates a side elevational view of wheel rim assembly 10. A number of bolt holes 17 are shown in addition to several cooling passages, some passages marked as axial passages 80 and 81. As illustrated, there are six longitudinal axially extending cooling passages to enhance cooling of the rim assembly 10.

Figure 6:
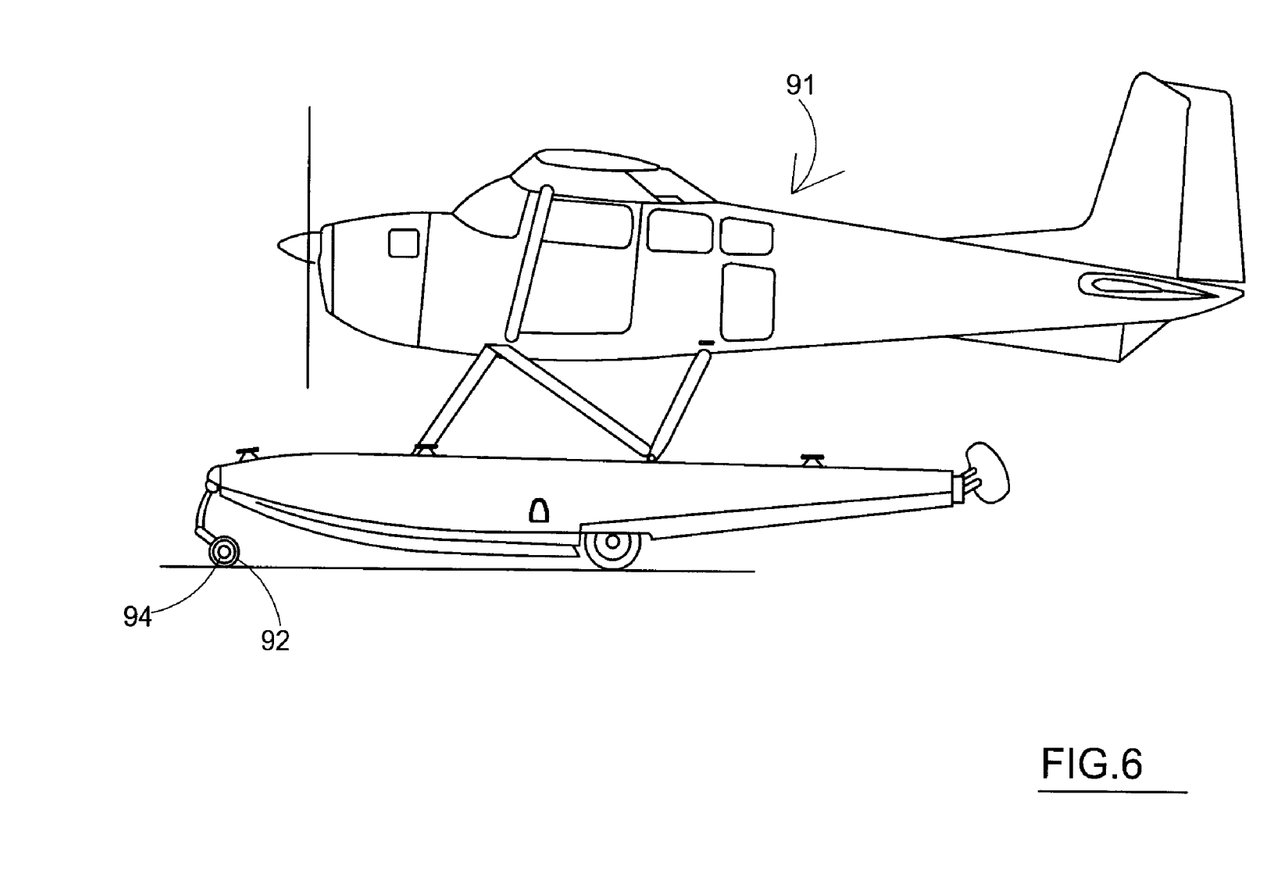
FIG. 6 diagrammatically illustrates an amphibious plane with the wheel rim assembly carrying a tire.

FIG. 6 diagrammatically illustrates an amphibious plane 91 having a wheel tire 92 mounted on wheel hub assembly 94.

To assemble the tire on wheel rim assembly 10, the user starts with left and right hub sections 12, 14 in a separated configuration as shown in FIG. 4. The tire is placed on external surface 34. Bearings are then mounted by interference fit or otherwise in a conventional manner in the hub sections. The hub section 12 is then mated with section 14. The sections are bolted together or otherwise affixed. The brake system may be added to the wheel hub assembly. The axle is inserted through the central passage of the wheel assembly in a conventional manner. The bearings are fitted onto the axle in a conventional manner, that is, into the center sections of each hub section 12, 14. This operation is fairly conventional. Retainers and o rings and other attachment systems are commonly used with the foregoing operation.

One of the important features of the present invention (there are several important features discussed herein) is the utilization of a radially inboard cavity 54, formed by inner walls 24, 26 of hub sections 12, 14, which is substantially completely filled with oil. Only a small amount, less than 10-15%, of the volume of cavity 54 is a thermal expansion air pocket. The bleed-fill valve means 72 is common in the industry. The user fills interior cavity 54 with aviation oil such that there is only a small air pocket. The air pocket is just large enough or just sufficient to account for thermal expansion and contraction of the cavity due to expansion or contraction of the wheel hub. The small thermal expansion air pocket is just large enough to accommodate thermal expansion and contraction such that oil is not forced out during thermal contraction of the wheel hub. The oil, being mainly incompressible, needs a small expansion air pocket to avoid leakage at extreme operating conditions.

It is typical that thermal expansion and contraction occurs to the wheel hub in a temperature range of about 190 degrees Fahrenheit to about 32 degrees Fahrenheit. Further, the wheel hub experiences thermal expansion and contraction over that temperature range in less than one minute and sometimes within 30 seconds. This is an abrupt expansion-contraction cycle. The temperature of the wheel hub assembly increases due to braking. A heavy brake load may heat up the wheel hub assembly to 190 degrees. The wheel hub is typically made of aluminum which absorbs heat or cold extremely fast when immersed in liquid. As is known, amphibious aircraft will taxi down a ramp into very cold water for take-off using their brakes, which use heats up the wheel hub assembly and causing this thermal contraction issue and problem.

The problem associated with the prior art occurs due to the severe and quick-acting thermal contraction and expansion cycle. Often times in prior art devices, due to thermal expansion and contraction, seawater would be pulled into the wheel hub assembly past the annular seal and past bearing assembly 60. The seawater then quickly deteriorates the system and destroys the bearing. As a result, it was common for amphibious aircraft owners to maintain two complete wheel hub assemblies in order to quickly replace one deteriorated assembly with another "fully greased" one.

With the present invention, the interior space 54 is substantially filled with oil, leaving a nominally sized thermal expansion air pocket 8 (FIG. 1B), just large enough to account for thermal expansion and contraction of the wheel hub such that substantially no oil is forced out of the radial cavity 54 during thermal contraction of the wheel hub. The oil is substantially incompressible. Therefore, the only expansion and contraction element in the cavity 54 is the small thermal expansion air pocket 8 left after oil substantially completely fills radially space 54. The fill-bleeder valve 72 enables the user to bleed and fill with oil the interior cavity 54. The fill operation preferably is conducted when one fill valve 72 is at the 1 PM orientation such that oil is injected into the cavity until the oil rises and the internal pressure in the small thermal expansion air pocket exceeds the injected oil supply pressure. This leaves the small air pocket 8 (generally including pocket 74) without oil. However, left and right bearings are maintained in the oil bath.

The claims appended hereto are meant to cover modifications and changes within the scope and spirit of the present invention.

What is claimed is:

1. A two-piece wheel rim assembly for an airplane tire adapted to be mounted on an amphibious aircraft comprising:

a first and a second wheel hub section affixed together to form a wheel hub for said airplane tire, said tire adapted to be mounted on said wheel hub;

said wheel hub mounted on an axle extending along an axial centerline of said wheel hub;

first and second bearings mounted between the respective first and second wheel hub sections and said axle such that said wheel hub rotates on said axle;

said first and second wheel hub sections forming a radial cavity about said axle with said first and second bearings mechanically sealing respective longitudinal end segments of the radial cavity; and an oil bath substantially filling said radial cavity except for a small air pocket only sufficient to account for thermal expansion and contraction of said wheel hub such that oil is not forced out of said radial cavity during thermal contraction of said wheel hub, the size of the air pocket established during a fill operation when an internal pressure of said oil bath and said thermal expansion air pocket in said radial cavity exceeds an injected oil supply pressure.

2. A two-piece wheel rim assembly for an airplane tire as claimed in claim 1 including a plug means for filling and bleeding said oil into and from said radial cavity, said plug means extending through one of said first and second wheel hub sections.

3. A two-piece wheel rim assembly for an airplane tire as claimed in claim 2 including two plug means.

4. A two-piece wheel rim assembly for an airplane tire as claimed in claim 3 including a plurality of nut and bolt sets which affix said first and second hub sections together.

5. A two-piece wheel rim assembly for an airplane tire as claimed in claim 4 wherein said wheel hub sections have respective radially outboard wall segments on which is mounted said airplane tire; each said wheel hub section having respective radially inboard wall segments, disposed radially inboard with respect to said respective radially outboard wall segments, and said wheel hub sections having a plurality of radial spokes therebetween to space said radially outboard wall segments away from said radially inboard wall segments and to form a plurality of longitudinal cavities about said radially inboard wall segments to cool said oil bath in said radial cavity of said wheel hub.

6. A two-piece wheel rim assembly for an airplane tire as claimed in claim 5 including a respective annular seal longitudinally outboard of the respective bearing, said annular seal disposed between the respective wheel hub section and the axle.

7. A two-piece wheel rim assembly for an airplane tire as claimed in claim 1 including a plurality of nut and bolt sets which affix said first and second hub sections together.

8. A two-piece wheel rim assembly for an airplane tire as claimed in claim 1 wherein said wheel hub sections have respective radially outboard wall segments on which is mounted said airplane tire; each said wheel hub section having respective radially inboard wall segments, disposed radially inboard with respect to said respective radially outboard wall segments, and said wheel hub sections having a plurality of radial spokes therebetween to space said radially outboard wall segments away from said radially inboard wall segments and to form a plurality of longitudinal cavities about said radially inboard wall segments to cool said oil bath in said radial cavity of said wheel hub.

9. A two-piece wheel rim assembly for an airplane tire as claimed in claim 1 including a respective annular seal longitudinally outboard of the respective bearing, said annular seal disposed between the respective wheel hub section and the axle.

10. A two-piece wheel rim assembly for an airplane tire adapted to be mounted on an amphibious aircraft comprising:
a first and a second wheel hub section affixed together to form a wheel hub for said airplane tire, said tire adapted to be mounted on said wheel hub;
said wheel hub rotatably mounted on an axle by first and second bearings which are longitudinally spaced apart on said axle;
said first and second wheel hub sections having respective radially inboard wall segments radially spaced from said axle which form a radial cavity about said axle longitudinally bounded by said first and second bearings; and
an oil bath substantially filling said radial cavity except for a thermal expansion air pocket adapted to be above said axle and said bearing when said wheel hub and airplane tire is in use, said thermal expansion air pocket having a nominal size only sufficient to account for thermal expansion and contraction of said wheel hub such that substantially no oil is forced out of said radial cavity during thermal contraction of said wheel hub, the size of the air pocket established during a fill operation when an internal pressure of said oil bath and said thermal expansion air pocket in said radial cavity exceeds an injected oil supply pressure.

11. A two-piece wheel rim assembly for an airplane tire as claimed in claim 10 wherein said wheel hub has thermal expansion and contraction in the temperature range of about 190 degrees Fahrenheit to about 32 degrees Fahrenheit in less than a one minute period and wherein said thermal expansion air pocket expands and contracts due to said oil being substantially incompressible when said radial cavity expands and contracts due to said wheel hub thermal expansion and contraction over said temperature range.

12. A two-piece wheel rim assembly for an airplane tire as claimed in claim 11 wherein said wheel hub sections have respective radially outboard wall segments on which is mounted said airplane tire; said radially outboard wall segments begin disposed radially outboard with respect to said radially inboard wall segments with a plurality of supporting radial spokes therebetween to form a plurality of longitudinal cavities about said radially inboard wall segments to cool said wheel hub during said thermal expansion.

13. A multi-piece wheel rim assembly for an airplane tire as claimed in claim 11 wherein said wheel hub sections have respective radially outboard wall segments on which is mounted said airplane tire; said radially outboard wall segments begin disposed radially outboard with respect to said radially inboard wall segments with a plurality of supporting radial spokes therebetween to form a plurality of longitudinal cavities about said radially inboard wall segments to cool said wheel hub during said thermal expansion.

14. A multi-piece wheel rim assembly for an airplane tire as claimed in claim 10 wherein said wheel hub has thermal expansion and contraction in the temperature range of about 190 degrees Fahrenheit to about 32 degrees Fahrenheit in less than a one minute period and wherein said thermal expansion air pocket expands and contracts due to said oil being substantially incompressible when said radial cavity expands and contracts due to said wheel hub thermal expansion and contraction over said temperature range.

15. A multi-piece wheel rim assembly for an airplane tire adapted to be mounted on an amphibious aircraft comprising:
a first and a second wheel hub section affixed together to form a wheel hub for said airplane tire, said tire adapted to be mounted on said wheel hub;
said wheel hub rotatably mounted on an axle by first and second bearings which are longitudinally spaced apart on said axle;
said first and second wheel hub sections having respective radially inboard wall segments radially spaced from said axle which form a radial cavity about said axle longitudinally bounded by said first and second bearings; and
an oil bath substantially filling said radial cavity except for a thermal expansion air pocket adapted to be above said axle and said bearing when said wheel hub and airplane tire is in use, said thermal expansion air pocket having a nominal size only sufficient to account for thermal expansion and contraction of said wheel hub such that substantially no oil is forced out of said radial cavity during thermal contraction of said wheel hub, the size of the air pocket established during a fill operation when an internal pressure of said oil bath and said thermal expansion air pocket in said radial cavity exceeds an injected oil supply pressure.

* * * * *